May 24, 1960  J. H. BARNES  2,937,902
RESILIENT TRIM MEMBER AND SECURING MEANS THEREFOR
Filed Aug. 1, 1956
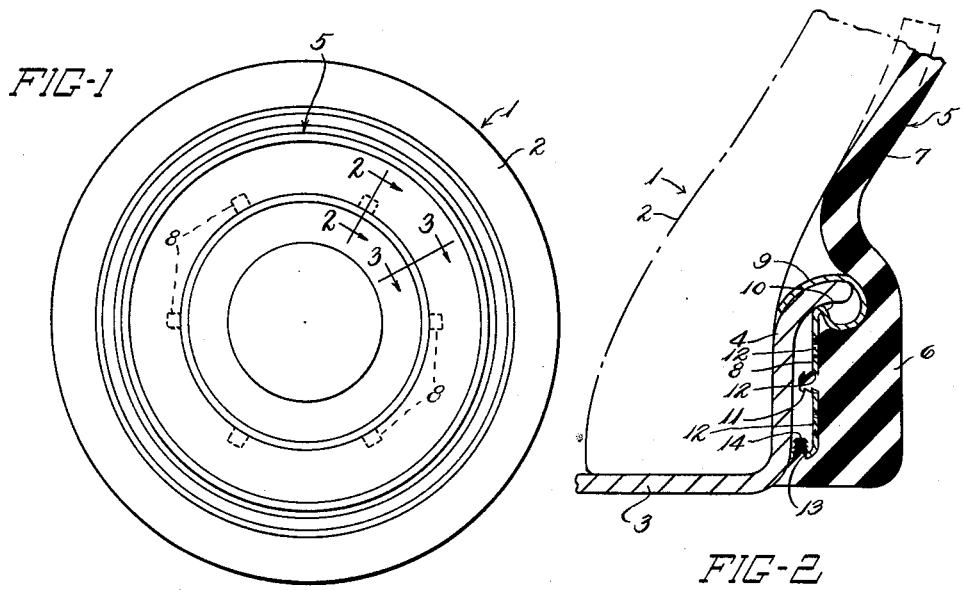
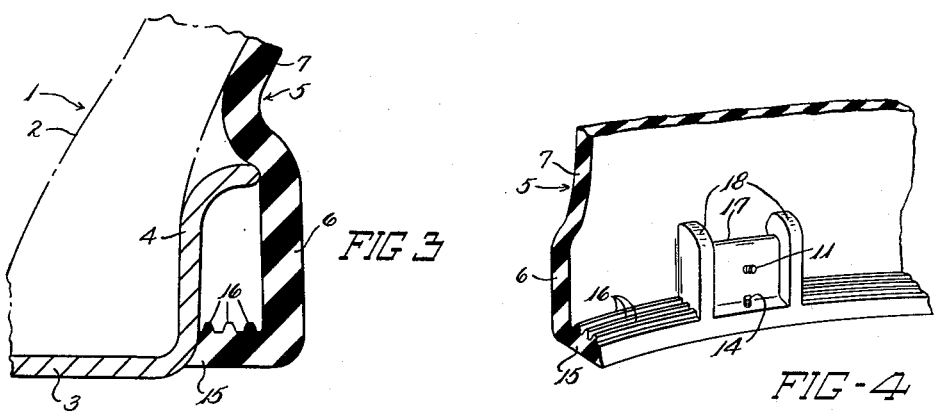
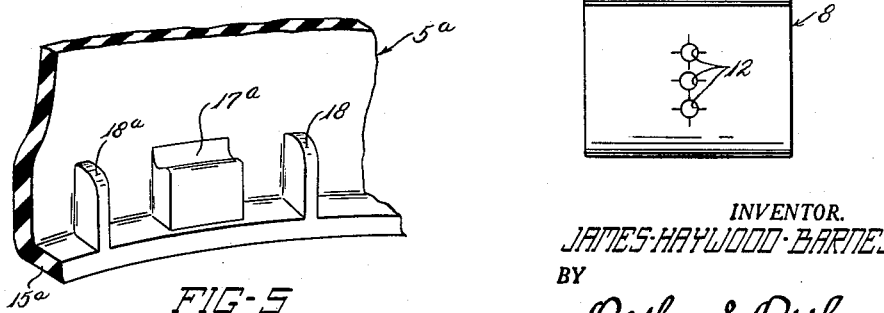
INVENTOR.
JAMES HAYWOOD BARNES
BY
Oldham & Oldham
ATTYS.

United States Patent Office 2,937,902
Patented May 24, 1960

2,937,902

RESILIENT TRIM MEMBER AND SECURING MEANS THEREFOR

James Haywood Barnes, Wadsworth, Ohio, assignor to Edward L. Wood, Detroit, and Charles B. Aske, Jr., Birmingham, Mich.

Filed Aug. 1, 1956, Ser. No. 601,415

8 Claims. (Cl. 301—37)

This invention relates to trim members, and especially to trim member assemblies and attachment means for securing the trim member assembly to a pneumatic tire and rim, which assembly is secured in position without deflation of the tire or other change of the tire and rim combination.

It is a well known fact that many people like to decorate their automobiles and make them as attractive as is possible. Hence, many new color styles are being provided today in all passenger vehicles. Also, many car owners like to have white sidewall tires on their cars, but find the expense of such tires prohibitive and/or find the maintenance of such white sidewall tires substantially an impossibility. Thus there is an appreciable demand for attractive sidewall members, separate from the tires, for use with tire and wheel assemblies and wherein any desired color can be provided in the attachment member which is made from rubber, rubber-like material or other plastic or similar substances. One of these prior sidewall trim and decorative members is shown in my own prior Patent No. 2,737,422, but is subject to the slight disadvantage that one must deflate the tire before the trim member can be associated therewith.

The general object of the present invention is to provide a new and improved type of a trim member and securing means therefor of the class described wherein the trim member assembly is characterized by the novel and firm positioning of a radially inner portion of the trim member with relation to an associated tire rim flange.

Another object of the invention is to provide a trim member of the class described wherein radially inner portions thereof have axially inwardly extending wall sections thereon for engaging a tire rim flange to space the skirt portion from a part of such rim flange.

Yet another object of the invention is to provide a plurality of axially extending wall means in a trim member to aid in retaining such trim member against any possible circumferential movement when affixed to a tire and rim assembly by the means described.

A further object of the invention is to affix a trim member to a tire and rim assembly by use of a plurality of clips and wherein the individual clips have a plurality of securing means associated therewith for locking a radially inner portion of a trim member thereto.

Still another object of the invention is to provide a trim member and assembly thereof as described hereinbefore and wherein the radially inner portion of the trim member is adapted to bridge over and cover any wheel weights carried by the rim flange.

The foregoing and other objects and advantages of the invention will be made more apparent as the specification proceeds.

In order to understand the present invention, reference should be had to the accompanying drawings, wherein:

Fig. 1 is an elevation of a tire and rim assembly having a trim member of the invention associated therewith;

Fig. 2 is a fragmentary enlarged vertical section of the operatively positioned trim member shown in Fig. 1, wherein such member comprises one embodiment of the principles of the invention, taken on line 2—2 of Fig. 1;

Fig. 3 is a fragmentary section like Fig. 2 only taken on line 3—3 of Fig. 1;

Fig. 4 is a fragmentary rear perspective view of the radially inner part of the trim member of Figs. 1 through 3;

Fig. 5 is a perspective view of yet another inner surface of a modified type of trim member of the invention; and Fig. 6 is an elevation of a clip of the invention.

When referring to corresponding parts shown in the drawings and referred to in the specification, corresponding numerals are used to facilitate comparison between such equivalent parts.

The present invention in general relates to the apparatus for attachment to a tire and rim assembly and comprising a resilient trim member having a skirt portion for extending in a radial direction over the lateral margin of the tire rim flange, and a flatly arcuate decorative portion for extending along a tire sidewall and resiliently engaging such sidewall, a plurality of clips for engaging a tire rim flange and extending radially inwardly therefrom and having locking apertures therein, and locking stud means carried by the trim member skirt for extending through the apertures in the clips to secure the trim member to a tire rim when the clips are engaged therewith, the skirt portion of the trim member also having axially inwardly extending walls thereon at circumferentially spaced portions thereof for engaging a rim flange to space the skirt portion from parts of the rim flange and aid in retaining the trim member in a desired position.

Reference now should be had to the details of the structure shown in the drawings and a combination trim member assembly of the invention is indicated as a whole by the numeral 1. This combination includes a pneumatic tire 2, and a conventional wheel or rim 3 having a rim flange 4 thereon. A resilient trim member 5 is positioned in this assembly by means to be described hereinafter. The trim member comprises a radially inner skirt portion 6 and radially outer arcuate flatly curved decorative or protective portion 7 which is adapted to extend radially outwardly from a tire rim and resiliently engage the sidewall portion of a tire.

Fig. 2 of the drawings indicates in dotted lines the original molded contour of the decorative portion 7 of the trim member and such portion of the trim member is originally so shaped, when molded, as to be forced axially outwardly at its outer end in order to set up resilient forces therein to aid the trim member in retaining itself in resilient hugging engagement with the sidewall of the tire 2. Of course, the tire 2 may be either a conventional tubed or tubeless tire, as desired.

It will be seen that the entire combination of the invention can be applied to the tire and rim assembly without any change thereof. Such positioning is effected partially by means of clips 8, usually made from metal, which have an overhanging top flange 9 thereon and have a looped middle section including a top or apex part 10 so that the clip 8 is adapted to be pounded or otherwise forced into engagement with the lateral margin of the rim flange 4 by engaging such rim flange edge between the flange 9 and apex 10 of the clip. These clips are made of suitable composition so as to have sufficient strength and to have the desired resiliency for retaining themselves fixedly in engagement with the rim flange when forced into the position shown in Fig. 2.

In order to secure the trim member 5 to the clips 8, a plurality of suitable studs 11 usually are molded into the skirt 6 of the trim member. These studs 11 may have heads of any desired shape or size and have shanks protruding axially inwardly from the trim member so as to engage with locking apertures 12 provided in the clips 8. Fig. 6 of the drawings best shows how a plurality of these locking apertures are provided in radially spaced relationship in the exposed face of each of the clips 8. Thus the stud 11 can be engaged with any of a plurality of the apertures 12 and will be resiliently retained therein by the desired locking engagement therewith inasmuch as splits or slots are provided adjacent these apertures 12 to provide resilient locking tabs or edges in the portions of the clip defining the apertures 12.

Another important feature of the clips 8 is that they have auxiliary locking holes or apertures 13 provided in the radially inner surfaces thereof and these apertures are adapted to engage with suitable studs or integral locking bosses 14 provided at the radially inner portions of the skirt 6 and with such studs or bosses 14 extending almost radially outwardly of the tire and rim assembly. This provides a plurality of locking engagement means for the trim member 5 at each one of the clips 8. Furthermore, inasmuch as the studs 11 and 14 extend in appreciably different directions, this further produces the desired locking or seating engagement of the trim member 5 on the clips 8.

It should be noted that the skirt portion 6 of the trim member 5 is of substantially right angular shape in section, as indicated best in Fig. 3. Thus an axially inwardly extending end 15 is provided on the skirt 6 and it may have circumferentially directed ribs 16 thereon for strengthening purposes so that the skirt end 15 is adapted to bridge over a portion of the rim flange 4, as shown in Fig. 3, being spaced from such rim flange at all portions except the laterally outer edge of the rim flange, and also engaging the rim adjacent the base of such flange. This construction of the skirt 6 permits it to bridge over any wheel weights carried by the rim 3 and in general provides a satisfactory finished appearance for this radially inner edge of the trim member 5.

Fig. 4 of the drawings best shows that the axially inner surface of the skirt 6 is built up or reenforced to provide thickened sections 17 generally contoured to the shape of the axially outer faces of the clips 8 at circumferentially spaced portions thereof. These sections 17 of the trim member 5 are circumferentially spaced equally and preferably about six of such sections are provided to agree with the number of clips normally used for positioning a trim member on a rim flange. A further feature of the invention resides in providing a pair of axially inwardly extending flanges or walls 18. The drawing indicates that these walls 18 are provided immediately adjacent the thickened section 17 so that the walls 18 will lie immediately circumferentially adjacent the margins of the clips 8 and will aid in preventing any circumferential movement or creeping of the trim member. This naturally will facilitate retaining both the clips 8 and trim member in given positions and in general reenforces the connection between the studs 11 and the clips with which they are engaged.

Fig. 5 of the drawings shows a perspective inner view of a modified type of trim member 5a of the invention. In this instance, the thickened or reenforced sections 17a may be provided to again normally seat against the clip means used for positioning this trim member on a tire and wheel assembly. However, in this instance, it is shown that the axially inwardly extending walls 18a may be circumferentially spaced any desired distance and may be used in general for bridging or spacing the skirt portion of the trim member 5a from the associated part of the wheel flange. This trim member 5a may or may not also have a section 15a thereon, as desired.

It should be noted that the trim member 5 having the end 15 thereon will bridge itself neatly around its entire inner periphery with relation to the tire rim flange and in general will provide a sturdy, non-flapping type of a construction for this type of a trim member.

It will be noted that the studs 11 may be omitted in some instances and this facilitates the radial adjustment of the trim members on a rim or wheel flange. Note that the axial inward inclination of the trim member occurs in only the radially outer portion of the decorative section of the trim.

Any type and number of studs and locking apertures are provided to secure the trim member in position. The studs may be made of the material from which the trim member is constructed, or they may be of metal. The studs may extend completely through the trim members and be separate therefrom.

The clips used may be vulcanized to or embedded at least partially in the trim members, as desired.

While several complete embodiments of the invention have been disclosed herein, it will be appreciated that modification of these particular embodiments of the invention may be resorted to without departing from the scope of the invention as defined in the appended claims.

What is claimed is:

1. In apparatus for being attached to a tire and rim assembly, clips for being secured to a tire rim flange, and a resilient trim member for association with a pneumatic tire sidewall, said trim member having stud means operatively associated therewith for engaging said clips to secure said trim member to a tire and rim assembly, said trim member having a radially inner skirt of generally right angular shape in section and extending axially inwardly from the trim member to bridge over part of a rim flange and only contact spaced portions thereof.

2. In apparatus for being attached to a tire and rim assembly, a plurality of clips for being secured to circumferentially spaced portions of a tire rim flange, and a resilient trim member for association with a pneumatic tire sidewall, said trim member having stud means extending axially inwardly therefrom for engaging said clips to secure said trim member to a tire and rim assembly, said trim member having a skirt portion with axially inwardly extending walls thereon for contacting a rim flange and reenforcing such portion of said trim member.

3. In apparatus for being attached to a tire and rim assembly, clips for being secured to a tire rim flange, and a resilient trim member for association with a pneumatic tire sidewall, said trim member having resilient stud means operatively associated therewith for engaging said clips to secure said trim member to a tire and rim assembly, said trim member having a radially inner skirt of generally right angular shape in section and extending axially inwardly from the trim member to bridge over part of a rim flange and only contact spaced portions thereof, said skirt portion having axially inwardly extending circumferentially spaced walls thereon for reenforcing such portion of said trim member.

4. In apparatus for being attached to a tire and rim assembly, clips for being secured to a tire rim flange, and a resilient trim member for association with a pneumatic tire sidewall, said trim member having stud means operatively associated therewith for engaging said clips to secure said trim member to a tire and rim assembly, said trim member having a radially inner skirt having axially inwardly protruding reenforcing means thereon to strengthen such portion of said trim member.

5. A combination for attachment to a tire and rim assembly and comprising a resilient trim member having a skirt portion for extending in a radial direction over the lateral margin of a tire rim flange and a flatly arcuate decorative portion for extending along a tire sidewall, a plurality of metal clips for resiliently engaging a tire rim flange and extending radially inwardly therefrom, said clips having locking apertures therein, and headed locking stud means carried by said skirt for extending through said apertures in said clips to secure said trim member to a tire rim when said clips are engaged therewith, said skirt portion having axially inwardly extending walls thereon at circumferentially spaced portions thereof for engaging a rim flange to space such skirt portion from portions of a rim flange.

6. A combination for attachment to a tire and rim assembly and comprising a resilient trim member having a skirt portion for extending in a radial direction over the lateral margin of a tire rim flange and a flatly arcuate decorative portion for extending along a tire sidewall, a plurality of clips for resiliently engaging a tire rim flange and extending radially inwardly therefrom, said clips each having a locking aperture therein, and stud means carried by said skirt for extending through said apertures in said clips to secure said trim member to a tire rim when said clips are engaged therewith, said skirt portion being of generally right angular shape and having axially inwardly extending walls thereon at circumferentially spaced portions thereof for engaging a rim flange and to hold parts of said skirt portion spaced therefrom.

7. A combination for attachment to a tire and rim assembly and comprising a resilient trim member having a skirt portion for extending in a radial direction over the lateral margin of a tire rim flange and a flatly arcuate decorative portion for extending along a tire sidewall, a plurality of clips for resiliently engaging a tire rim flange and extending radially inwardly therefrom, said clips having locking apertures therein, and locking stud means carried by said skirt for extending through said apertures in said clips to secure said trim member to a tire rim when said clips are engaged therewith, said skirt portion having pairs of axially inwardly extending walls thereon at circumferentially spaced portions thereof for engaging a rim flange and for snugly receiving a clip therebetween.

8. A combination for attachment to a tire and rim assembly and comprising a resilient trim member having a skirt portion for extending in a radial direction over the lateral margin of a tire rim flange and a flatly arcuate decorative portion for extending along the sidewall of a tire mounted on such tire rim, a plurality of metal clips for resiliently engaging circumferentially spaced parts of a tire rim flange and extending radially inwardly therefrom, said clips having locking apertures therein, and headed locking stud means carried by said skirt but protruding therefrom for extending through said apertures in said clips to secure said trim member to a tire rim when said clips are engaged therewith, the heads of said stud means being embedded completely within said skirt.

References Cited in the file of this patent

UNITED STATES PATENTS

| | | |
|---|---|---|
| 2,036,757 | Hume | Apr. 7, 1936 |
| 2,173,321 | Hatch | Sept. 19, 1939 |

FOREIGN PATENTS

| | | |
|---|---|---|
| 1,061,278 | France | Nov. 25, 1953 |